(12) United States Patent
Savelyev

(10) Patent No.: US 10,516,548 B2
(45) Date of Patent: Dec. 24, 2019

(54) ELECTRONIC COMMUNICATIONS CONTROL

(71) Applicant: Arm Limited, Cambridge (GB)

(72) Inventor: Roman Savelyev, Oulu (FI)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/916,314

(22) Filed: Mar. 9, 2018

(65) Prior Publication Data

US 2018/0331850 A1 Nov. 15, 2018

(30) Foreign Application Priority Data

May 9, 2017 (GB) .................................. 1707442.8

(51) Int. Cl.
*H04L 12/40* (2006.01)
*G06F 13/366* (2006.01)
*H04L 5/00* (2006.01)

(52) U.S. Cl.
CPC ........ *H04L 12/4013* (2013.01); *G06F 13/366* (2013.01); *H04L 5/0055* (2013.01); *H04L 12/40084* (2013.01)

(58) Field of Classification Search
CPC ............... H04L 12/4013; H04L 5/0055; H04L 12/40084; G06F 13/366
See application file for complete search history.

(56) References Cited

U.S. PATENT DOCUMENTS

| 6,272,193 B1 * | 8/2001 | Eglit ..................... G09G 5/008 370/503 |
| 2005/0015529 A1 | 1/2005 | Jung et al. |
| 2009/0310489 A1 | 12/2009 | Bennett |

OTHER PUBLICATIONS

Combined Search and Examination Report for GB 1707442.8, dated Nov. 7, 2017, 6 pages.

* cited by examiner

*Primary Examiner* — Duc C Ho
(74) *Attorney, Agent, or Firm* — Nixon & Vanderhye P.C.

(57) ABSTRACT

Disclosed are methods and apparatus for multiplex operation of an electronic transmitting apparatus, comprising establishing logical channels between logical data producers and respective logical data consumers, the logical channels operable to pass data over a serial physical channel, constructing by a producer a payload, identifying a respective consumer, arbitrating use of the serial physical channel between logical channels to control sending of payloads, injecting a channel-specific logical protocol stop indicator into a data flow over the serial physical channel to instruct a receiving router to stop receipt of a previously started data flow and route the payload to a consumer, and sending at least a first uninterruptible data unit of the payload over the serial physical channel. Corresponding methods and apparatus are provided to enable a receiver to route payloads to consumers according to received logical protocol stop indicators.

11 Claims, 12 Drawing Sheets

ELECTRONIC COMMUNICATIONS CONTROL

This application claims priority to GB Patent Application No. 1707442.8 filed 9 May 2017, the entire contents of which is hereby incorporated by reference.

FIELD OF THE INVENTION

The present technology relates to apparatus and methods for operating electronic systems to cause multiplexing logical operation over a serial physical channel.

BACKGROUND

Some electronic devices, particularly those intended to limit consumption of resources, or which are otherwise design or cost constrained, are limited to transmission of data over a single physical, often serial, channel.

SUMMARY

In various implementations, a first approach in the present technology provides a machine-implemented method of multiplex operation of an electronic transmitting apparatus, comprising establishing at least two logical channels between channel-specific logical data producers associated with the electronic transmitting apparatus and respective channel-specific logical data consumers dissociated from the electronic transmitting apparatus, the at least two logical channels operable to pass data over a serial physical channel, constructing by a first of the at least two channel-specific logical data producers a first variable-length data frame payload, identifying a respective channel-specific logical data consumer for the first variable-length data frame payload, arbitrating use of the serial physical channel between the at least two logical channels to control sending of the first variable-length data frame payload, injecting a channel-specific logical protocol stop indicator into a data flow over the serial physical channel to instruct a receiving router to stop receipt of a previously started data flow and route the first variable-length data frame payload to a channel-specific consumer, and sending at least a first uninterruptible data unit of the first variable-length data frame payload over the serial physical channel.

In various implementations, a second approach in the present technology provides a machine-implemented method of multiplex operation of an electronic receiving apparatus, comprising receiving from a transmitting apparatus over a serial physical channel a data transmission comprising a channel-specific logical protocol stop indicator and a variable-length data frame payload, identifying an intended consumer according to the channel-specific logical protocol stop indicator, and passing the variable-length data frame payload to the intended consumer identified by the channel-specific logical protocol stop indicator. Implementations of the described technology provide a very lightweight multiplexer protocol allowing the implementation of multiple logical communication channels over a single physical serial communications channel. The disclosed technology introduces low protocol overhead and allows implementation of advanced quality-of-service (QoS) policies at the transmission end, such as weighting of channel use according to various selection schemes, such as prioritization. Refinements of the technology provide, among other features, expandable multiplexing and selectivity of control indicators according to various criteria.

A further approach of the present technology provides a computer program comprising computer program code to, when loaded into a computer system and executed thereon, cause said computer system to perform all the steps of any of the methods described herein.

A further approach of the present technology provides an electronic data transmission apparatus adapted by the provision of at least one escaper component and at least one arbiter component to perform all the steps of the transmission methods described herein.

A further approach of the present technology provides an electronic data receiving apparatus adapted by the provision of at least one unescaper component and at least one router component to perform all the steps of the receiving methods described herein.

BRIEF DESCRIPTION OF THE DRAWINGS

Implementations of the disclosed technology will now be described, by way of example only, with reference to the accompanying drawings, in which.

DETAILED DESCRIPTION

Figure 1:
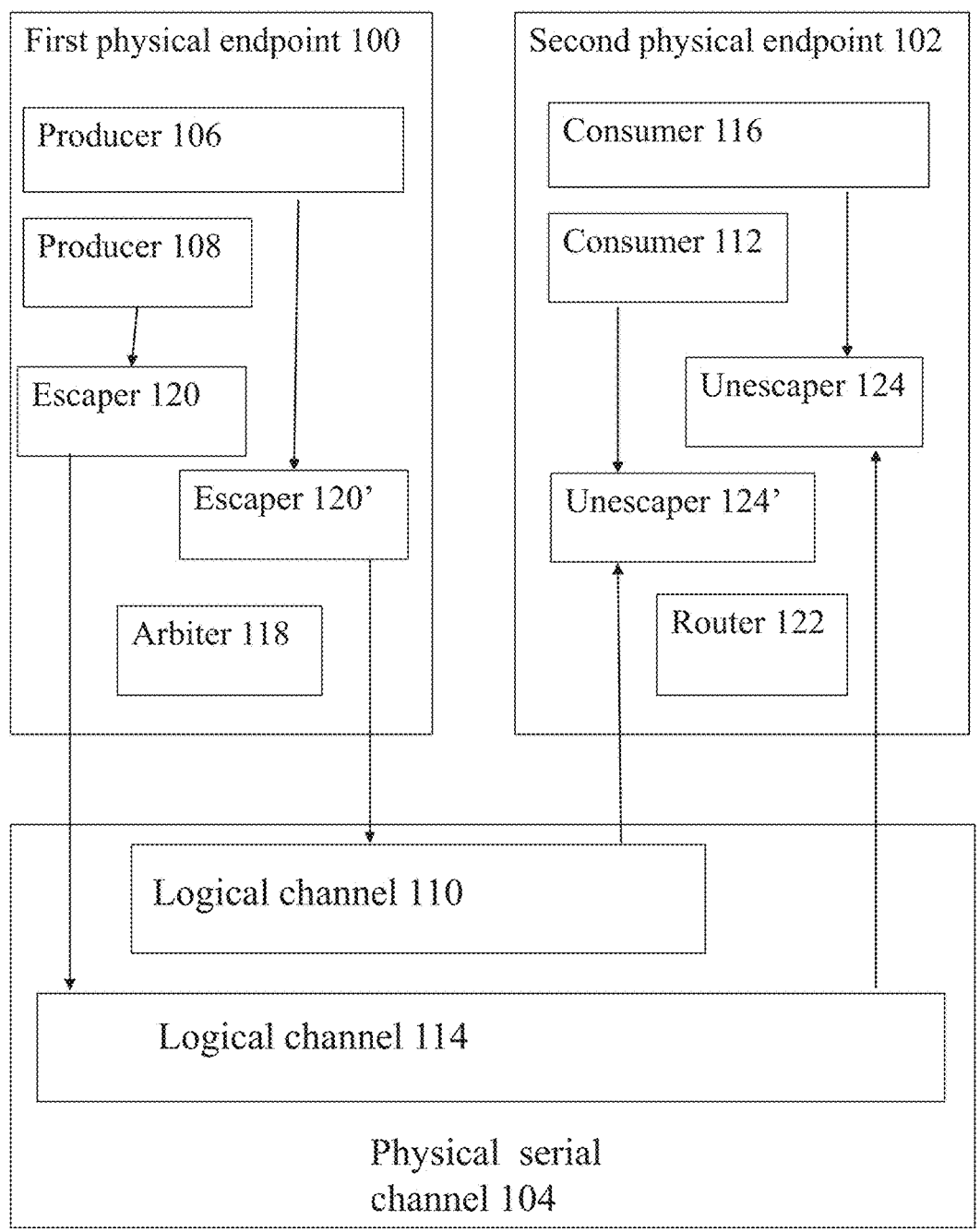
FIG. 1 shows a simplified image of a logical and physical channel arrangement to illustrate a set of components of the presently described technology.

The number of different data streams an electronic system must transmit or receive may be significant. A constrained system may not offer enough dedicated channels over which to communicate the data streams. This is a serious constraint affecting system design viability. Examples of data sources in a typical electronic system (such as an embedded system) include: STDOUT, STDERR, debugging traces, file transfer and firmware download. While some data sources convey only textual information and be suitable for transfer in an inconsistent manner, others may be emitting binary data requiring consistent transfer. Some data will be high priority and other data can be buffered for delayed transmission. In an implementation, there may be provided a system, such as an embedded system, with a single serial channel (for example, USART) used to convey multiple logical data streams, including for example, STDOUT, STDERR and traces. STDERR and tracing streams are typically mission critical and must be drained to the receiver as soon as possible, whereas STDOUT may be buffered and have a lower priority. The tracing stream may also contain binary data, rather than character-coded data, and this may introduce additional complexity to any encoding scheme that seeks a low protocol overhead.

Implementations of data transfer protocols conventionally involve framed data transmission. Choosing the right frame length may involve complex decisions about engineering development complexity and cost. A frame must be transferred completely before the next one can begin. Too big a frame size and any stream prioritization does not function at its best. Too small a frame size often leads to sub-optimal performance due to protocol overhead. In a framed protocol it is mandatory to guarantee uninterrupted transmission of protocol overhead. The disclosed technology adds a minimal uninterruptible overhead of one byte. According to implementations of the present technology, the physical communication medium is required to have a minimal transfer unit of one byte. Transmitted data is interleaved at a byte level, i.e. all bits in a byte always originate from a single producer and belong to a single consumer. From the protocol standpoint, atomic bytes are collected into frames. A frame is a contiguous sequence of bytes to be delivered to a specific consumer.

A complete alphabet of transferable 8-bit bytes comprises 256 characters. Some of them need to be distinguished to support the protocol. At the very least, in a system that attempts to multiplex logically over a single serial physical channel, a code point must be assigned for a marker (or indicator) to indicate any change between producer-consumer pairs—that is, a channel-switch marker or indicator. Because the technology has no control over its input stream, there also needs to be a marker or indicator that an incidentally occurring instance in the input of a byte having the same bits that would normally constitute a channel-switch marker is to be treated instead as normal data. This indicator is generally referred to in the art as an escape symbol, often seen as ESC. Where ESC precedes such an incidental occurrence of an 8-bit sequence that is to be transmitted verbatim, there must exist an entity at the producer end that recognises such an incidental occurrence and injects an ESC prior to the 8-bit sequence. Thus, in the simplest possible case, two code points in the code page need to be distinguished for channel control purposes. This would only provide a very simple switching and escaping mechanism, and so, in reality, and to provide true multiplex logical operation, more code points will need to be distinguished, and additional measures will need to be taken to ensure that channels are switched when that is required and that the incidental occurrences described above are transmitted verbatim with consistency.

In fact, the following example illustrates one further need. The escaped incidental occurrence of a sequence of bits that is the same as a channel switch marker (here shown as A) must be transmitted literally, that is, it must not cause a break in the frame and a consequent channel switch. Because the present technology must also accommodate asynchronous operation, and because the minimum uninterruptible transmission is one byte, the following may happen:

Channel A is selected by a channel-selector entity to be the data producer to use the physical serial communications channel with channel switch marker A Producer-A wants to transmit a byte from its data incidentally corresponding to a channel switch marker An escape byte ESC is inserted to indicate that the following byte is to be treated as data rather than as a channel switch marker Producer-A's transmission is interrupted with a channel switch marker B to start a new frame The sequence actually transmitted over the physical channel and received at the receiving end is the incorrect sequence "A ESC B". This means that channel A has been selected and contains an ESC, but because the minimal uninterruptible unit of transfer is one byte, the interruption with the channel B marker causes the actual channel switch marker "B" to be incorrectly sent verbatim as data to Consumer A, rather than causing the correct channel switch to channel B.

The above scenario shows us that, even when escaped, the incidental occurrence of the value of a channel switch marker may not be safely transmitted. It is thus necessary, even in the simple two-channel case, to dedicate another code point for a transposed "synonym" of the channel switch marker for use in escaped form. There is thus a need, in the above example, for the transpositions:

A→a

B→b

This is achieved by using a transposed form of the channel switch marker after ESC and arranging for an entity at the receiving endpoint to recognise the transposed form after the ESC and to reverse the transformation to produce the original byte of data verbatim to the consumer.

In FIG. 1, there is shown a simplified image of an embodiment of a logical and physical channel arrangement according to the presently described technology. In this simplified arrangement, there are provided a first physical endpoint 100 and a second physical endpoint 102, connected by a physical serial communications channel 104. At first physical endpoint 100 there are provided a first logical data producer 106 and second logical data producer 108. First logical data producer 106 is connected by logical channel 110 to first logical data consumer 112 located within second physical endpoint 102 and second logical data producer 108 is connected by logical channel 114 to second logical data consumer 116 located within second physical endpoint 102. In the simplest embodiment of the present technology, first physical endpoint 100 further comprises an arbiter 118 and a set of escapers 120, 120', which cooperate to encode the flow of data to second physical endpoint 102, and both of which will be explained in detail below. Second physical endpoint 102 further comprises a router 122 and a set of unescapers 124, 124' which cooperate to decode and control the flow of data at second physical endpoint 102, and both of which will be explained in detail below. It will be clear to one of ordinary skill in the art that this arrangement is artificially simple and is intended for ease of explanation and for illustration purposes only.

Communications between first logical data producer 106 and second logical data producer 108 and escapers 120, 120' are regulated so that a producer is not allowed to push the next byte to the escapers 120, 120' until the previous one has been acknowledged (ACK). The same rule applies for the communication between escapers 120, 120' and arbiter 118. When a producer presents a bit sequence that incidentally matches a marker byte, the escapers 120, 120' need to manage 2 bytes—the escape marker and the transposed form of the byte that incidentally matched the marker byte. They will not generate ACK until they have received two ACKs from the arbiter.

Figure 2:
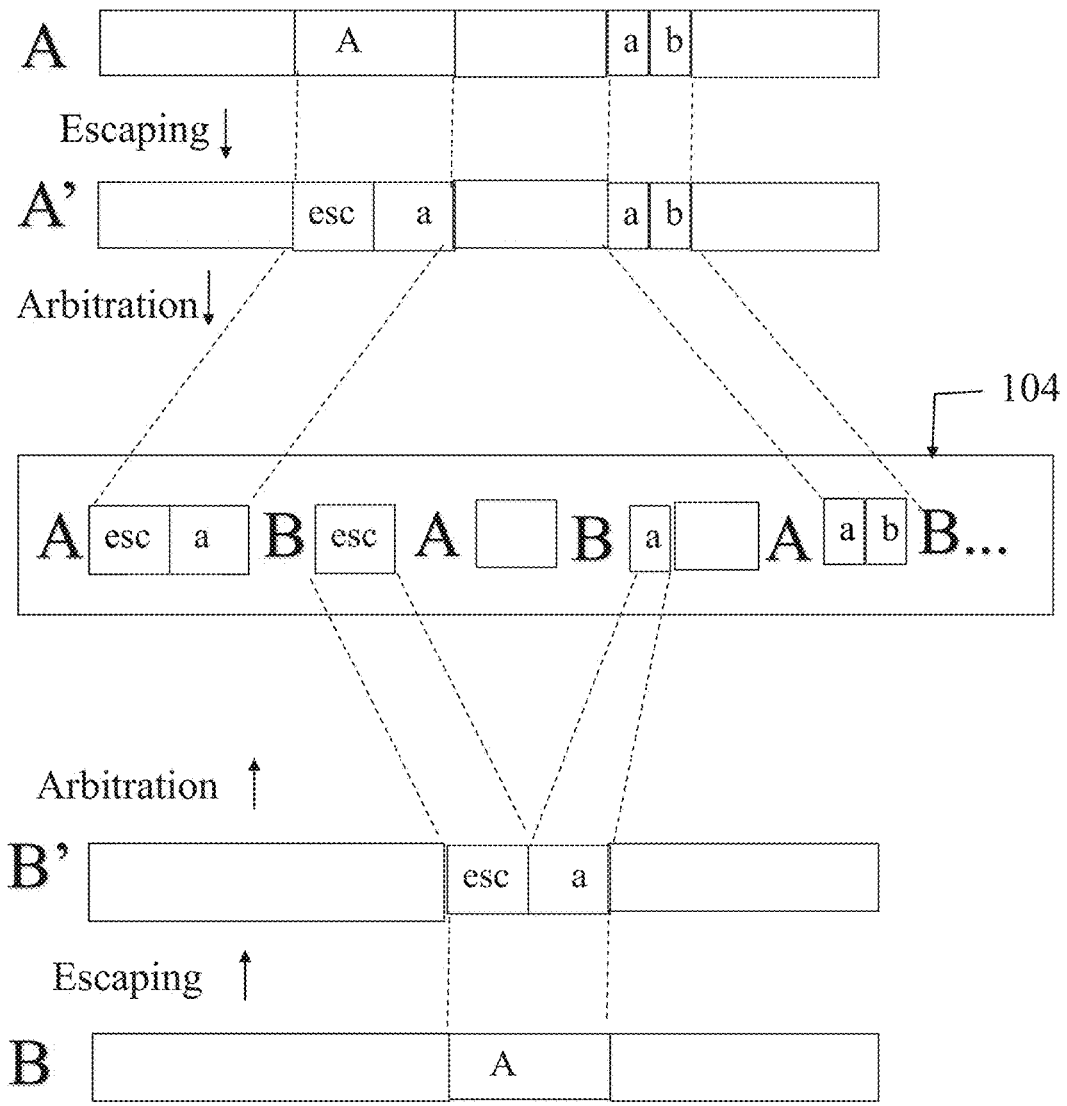
FIG. 2 shows a simplified example of an encoding sequence underlying the presently described technology.

In FIG. 2 are shown the stages of encoding a flow of data to be sent over physical serial communications channel 104 according to the simplified model described above for FIG. 1. In FIG. 2, logical data producers A and B are competing for use of physical serial communications channel 104.

Logical data producer A produces a raw input data stream containing a byte "A", which is the same sequence of bits as a reserved marker that would normally mark a logical channel switch to transmit data from logical data producer A. To avoid an incorrect logical channel switch, the "A" byte is replaced by escapers 120, 120' with the escape marker "esc" and a transposed version of "A"—shown here as lower-case "a", and the data is then available to the arbiter 118 at A' ready to be transmitted verbatim, in the same manner as "normal" bytes from the code table, such as the lower-case "a" and "b" shown in the input of logical data producer A. When the arbiter 118 elects to transmit data produced by logical data producer A, it injects "A" into physical serial communications channel 104. Election of a channel by said arbiter for transmission may follow any one of the many algorithms known in the art—for example, the arbiter 118 may change channels according to a time-slicing algorithm, or there may be implemented a prioritization scheme, and so forth. When arbiter 118 elects to transmit channel A data, it uses the data modified by the escaper 120, that is, the data as shown at A'.

Figure 3:
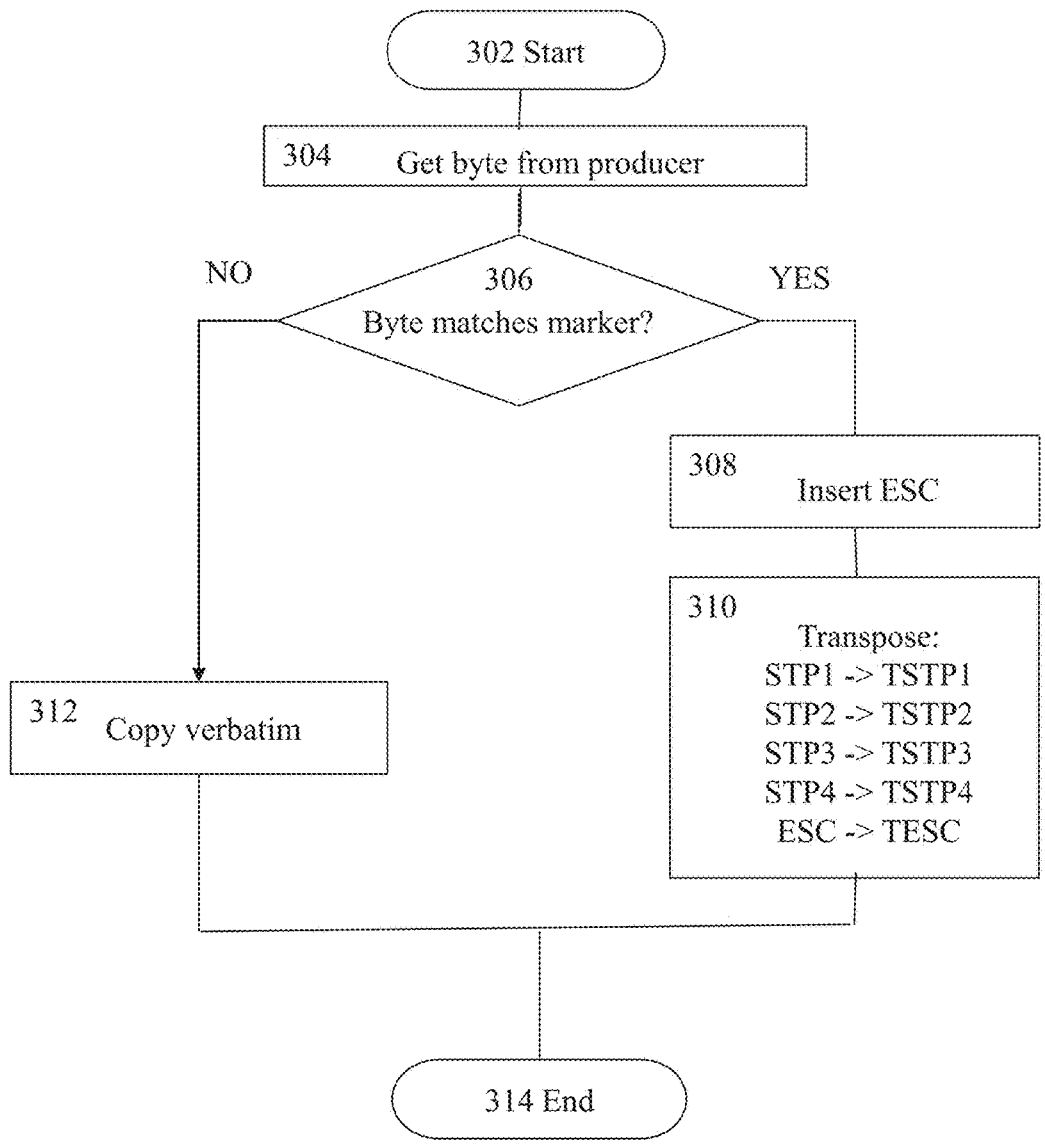
FIG. 3 shows an exemplary method of operation of an implementation of the escaper of FIG. 2.

FIG. 3 shows an exemplary method of operation 300 of an implementation of one of the escapers 120, 120' of FIG. 2. In the exemplary case shown in FIG. 3, a more realistic set of markers is introduced. The markers comprise STP1, STP2, STP3 and STP4. Each of these, and the ESC marker itself, must have a transposed form for use after ESC (shown in step 310, each transposed form prefixed with the letter "T"). The process starts at Start step 302, and at step 304, a byte of input data is accepted from a logical data producer. At test step 306, it is determined whether the byte contains the same sequence of bits as a reserved marker that would normally mark a logical channel switch. If the outcome of test step 306 is negative, the byte is passed verbatim at step 312 for transmission over physical serial communications channel 104 when the relevant channel is selected by arbiter 118, and the process ends at End step 314. If the outcome of test step 306 is positive, the relevant one of the set of escapers 120, 120' inserts ESC at step 308 and transposes the byte at step 310, and the process finishes at End step 314. The escaper is then free to iterate as needed once the corresponding ACK has been received.

Figure 4:
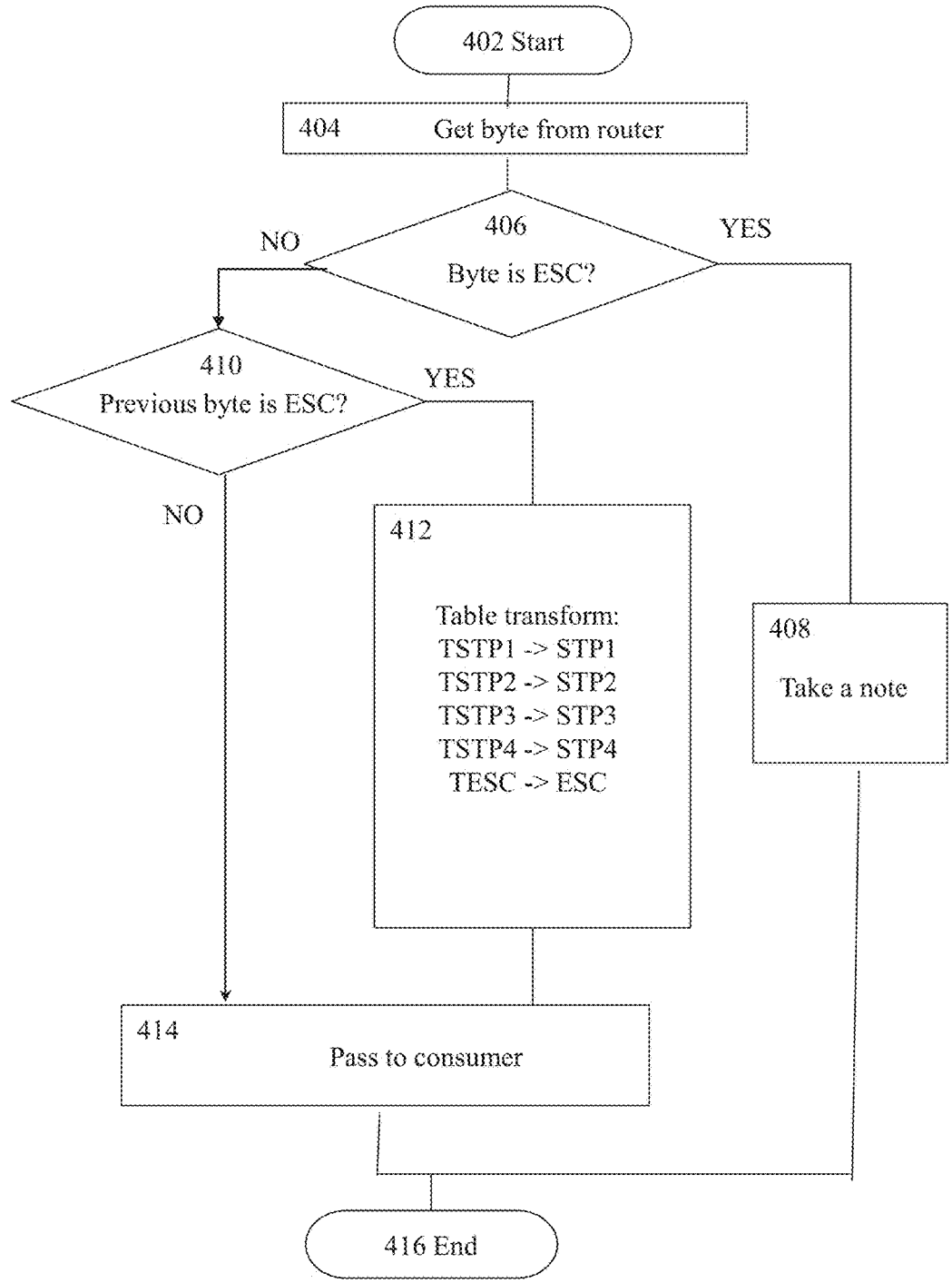
FIG. 4 shows an exemplary method of operation of an implementation of the unescaper of FIG. 2.

FIG. 4 shows an exemplary method of operation 400 of the corresponding unescapers at the receiving end of the transmission. The process begins at START step 402. At step 404, a byte is acquired from router 122. Test step 406 determines whether the byte is an ESC. If so, at step 408, the relevant unescaper takes a note of the fact, and the process completes this iteration at END step 416 after the requisite ACK is received. If the outcome of test step 406 is negative, test step 410 tests whether the previous byte was an ESC. If the test at step 410 determines that the previous byte was not an ESC, the byte is passed to step 414, at which the byte value is passed as normal data to the consumer. If step 410 determines that the previous byte was an ESC, at step 412, if the byte following the ESC is one of the transposed values (TSTP1, TSTP2, TSTP3, TSTP4, TESC), the transposition is reversed by the relevant one of the unescapers 124, 124', the byte is passed to the consumer at step 414 and the process completes at END step 416 after the requisite ACK is received. (The case in which the byte following the ESC is not one of the transposed bytes is not defined in the present technology, and may be dealt with in any of a number of ways, such as by gracefully terminating the process and emitting an error signal, calling an error handler, or the like.) However, in the non-error case defined in the present technology, after End step 416, the unescaper is free to iterate as needed.

Figure 5:
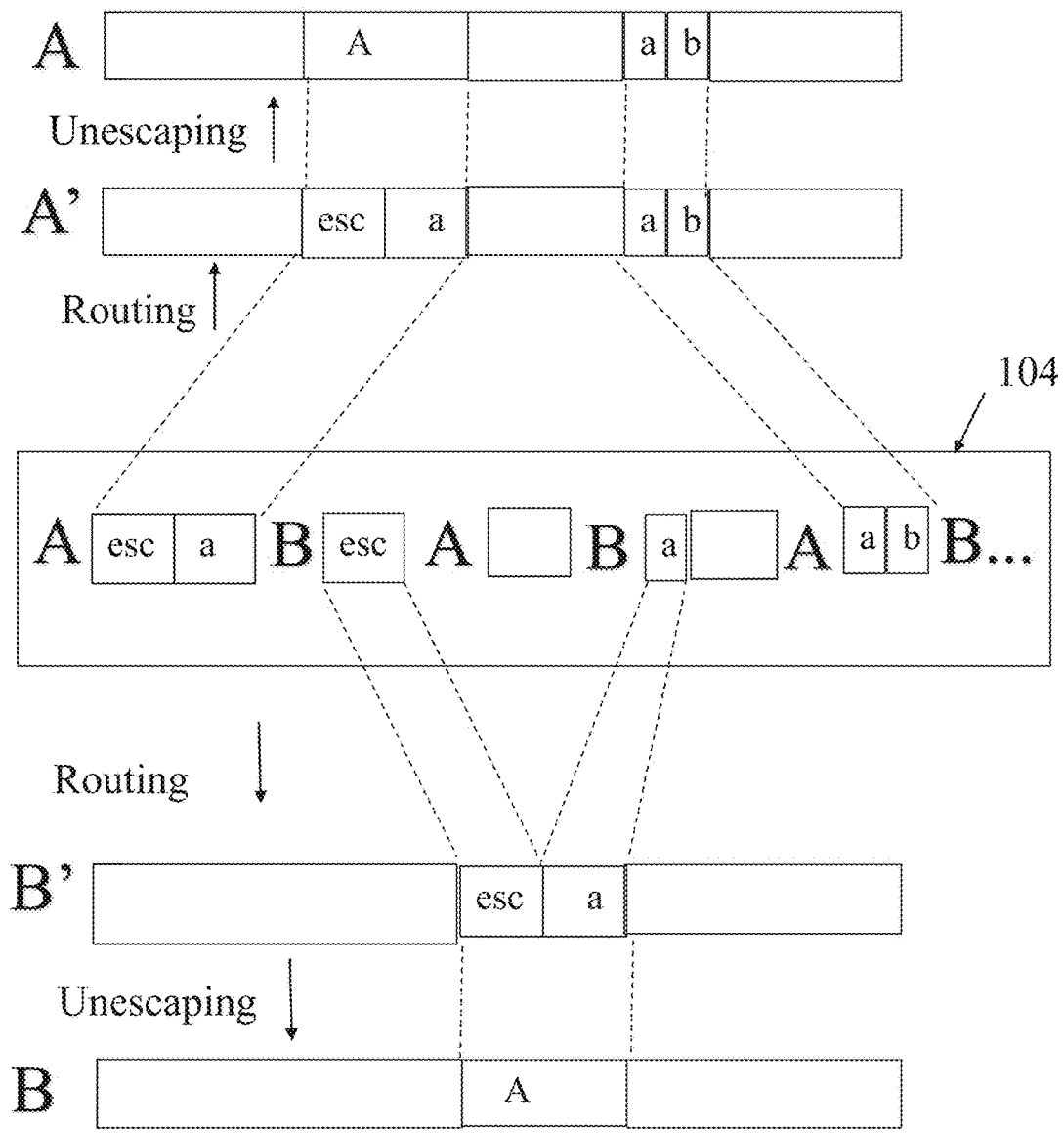
FIG. 5 shows a simplified example of a decoding sequence underlying the presently described technology.

In FIG. 5 are shown the stages of decoding the flow of data encoded using the stages of FIG. 2 and sent over physical serial communications channel 104 according to the simplified model described above for FIG. 1. Data from physical serial communications channel 104 is routed according to the received channel select markers to logical data consumers A and B, the data being mediated at A' and B' to unescape and transform any incidental sequences that were escaped and transformed during the encoding sequence shown in FIG. 2. In the exemplary case shown here, each occurrence of "esc a" is restored by the unescapers, respectively at A' and B', into an "A" byte, thus giving the original verbatim as input to the encoding process. Normal bytes "a" and "b" are handled as normal, being unmediated by the unescapers, as they were not escaped and transformed during the encoding process of FIG. 2. The received data is thus shown at logical data consumers A and B.

Thus, in the decoding scenario, the router 122 walks over the incoming stream from the serial physical channel 104. Whenever it encounters an "A" channel switch marker, all the data following it is passed to the unescaper dedicated to the A consumer, until it meets "B" marker.

Because any incidental occurrences of a channel-switch marker are escaped and transformed before being sent over the serial physical channel thus:

incidental marker→escape code+transposed marker

This means that a channel-switch marker found in an untransposed form in the received stream by the router 122 can only have one meaning—"switch the routing of the subsequent data to the relevant consumer". If the marker was not to be transposed, the router would need to be more sophisticated, leading to greater protocol overhead. At the same time the arbiter 118 has a freedom of switching producers at any moment.

As seen in FIG. 2, an ESC and its following transposed marker can be broken apart and data from other producers may be freely injected between ESC and the transposed marker without causing any difficulty. When the channel that issued the ESC is re-selected by the arbiter 118, the ESC and transposed marker appear contiguous to the relevant consumer.

To recover the original stream, the incoming data is unescaped thus:

escape code+transposed marker→incidental marker

In a similar manner, if the sequence of input bits to be sent incidentally matches the escape byte, the escaper turns the byte into an ESC TESC sequence, where TESC is a transposed escape. Sending bytes incidentally matching TESC without a preceding ESC simply means that the byte is treated as normal data.

In the presently disclosed technology the process by which the switch between the logical channels over which data streams are passing is achieved by issuing a simple stop marker STP, which reduces the protocol overhead that would be required by more complex protocol architectures. A stop marker is injected by the arbiter 118 of FIG. 1, and can appear anywhere in the stream. STP has a transposed synonym TSTP, which follows the above rules. Again, like TESC, if it is not preceded by ESC, it is treated as normal data to be sent verbatim.

Because frame length is not required as part of a frame header, a frame can virtually have any length. Instead of a conventional frame header or header-footer arrangement, the simple stop marker or markers are defined. Every meaningful byte traveling over the serial physical protocol belongs to some frame and every frame belongs to some consumer STP is thus expanded according to the index of the consumer to which the new data frame is directed. Thus, rather than the A and B markers hitherto used in the examples, there may be used STP1 and STP2. A stop marker always ends the previous frame and starts the next. At the start of the transmission, all data received before the first stop marker is discarded as garbage. A stop marker may appear on the line at any moment, as the arbiter is free to switch channels at any time according to any one of a number of techniques, including, for example, a time-slicing technique, a preferential producer or consumer, or some predetermined prioritization scheme based on data-type of transmission. Stop markers may come back-to-back, giving an empty frame. A stop marker breaks frame transmission, but the transmission of a stop marker cannot be interrupted. Because the minimum uninterruptible unit of the present technology is one byte, the stop marker occupies one byte. In embodiments, the channel-specific logical protocol stop indicator may be selected from a set of least-used codes of a code page for a type of data in the data frame payload.

In a more realistic implementation than the simple two-channel arrangement having channels A and B described above, there is provided a basic, but realistically useful, arrangement in which four logical channels are available for multiplexing over a single serial physical communications channel.

In this implementation, consumer identification (a channel-specific element) is a part of the stop marker. The following is a complete list of special values needed for a four-channel multiplexing implementation:

STP0, STP1, STP2, STP3—logical channel switch stop markers for each target consumer TSTP0, TSTP1, TSTP2, TSTP3—transposed stop markers to provide the necessary synonyms when a byte matching a stop marker appears in the input data ESC—escape byte TESC—transposed escape This enables the use of four logical channels connecting Producer0-Consumer0, Producer1-Consumer1, Producer2-Consumer2, and Producer3-Consumer3. Each producer has its own dedicated instance of the escapers 120, 120', as described above, and each consumer has its own dedicated instance of the unescapers 124, 124'.

Figure 6:
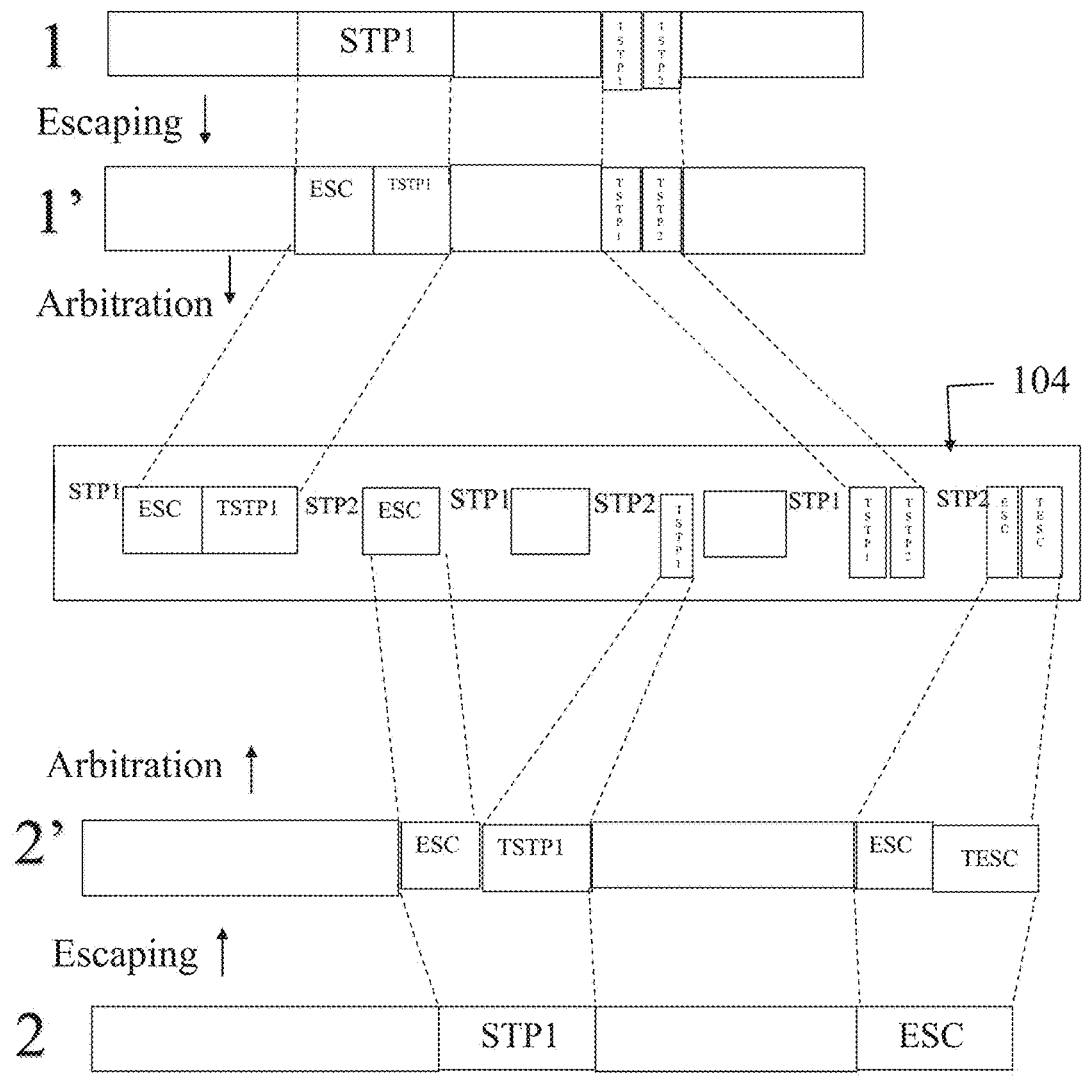
FIG. 6 shows a more realistic example of an encoding sequence.

FIG. 6 shows an example of the channel-switching and encoding process matching that of FIG. 2, in which Producer1 and Producer2 correspond to producers A and B of FIG. 2. Examples of the appropriate channel switch markers STP1 and STP2 are shown in use. Also shown at A' and B' are the escaped and transposed equivalents shown above, TSTP1 and TSTP2, and the transformed TESC appears as the synonym of an input character that incidentally matches the ESC marker.

Figure 7:
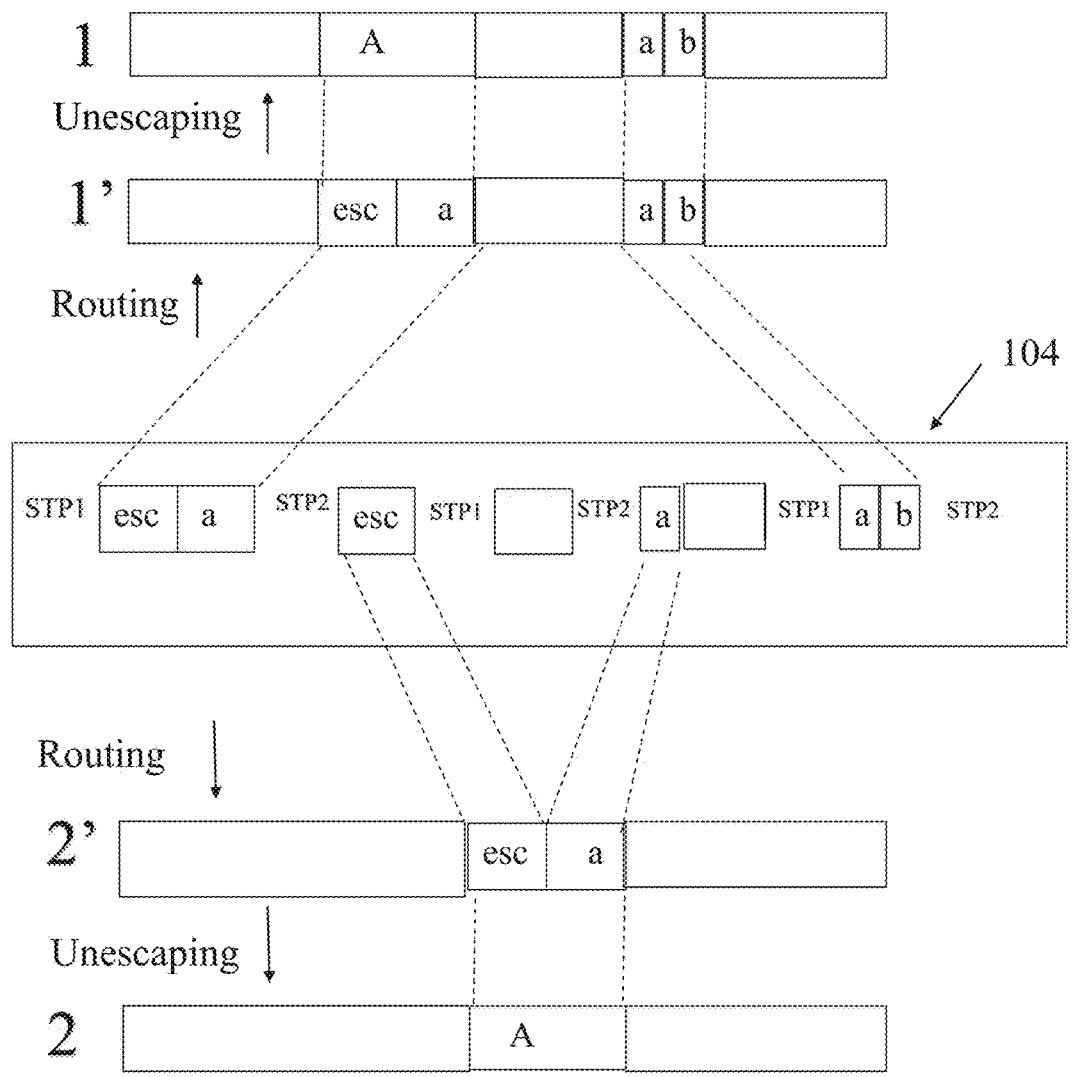
FIG. 7 shows a more realistic example of a decoding sequence.

FIG. 7 shows the corresponding example of the decoding process matching FIG. 5 in the same manner as FIG. 6 maps to FIG. 2. In FIG. 7, Producer1 and Producer2 correspond to producers A and B of FIG. 2. At A' and B' are the unescaped and reverse transposed equivalents, STP1 and STP2 from TSTP1 and TSTP2, and the reverse transformed ESC from TESC also appears.

Figure 8:
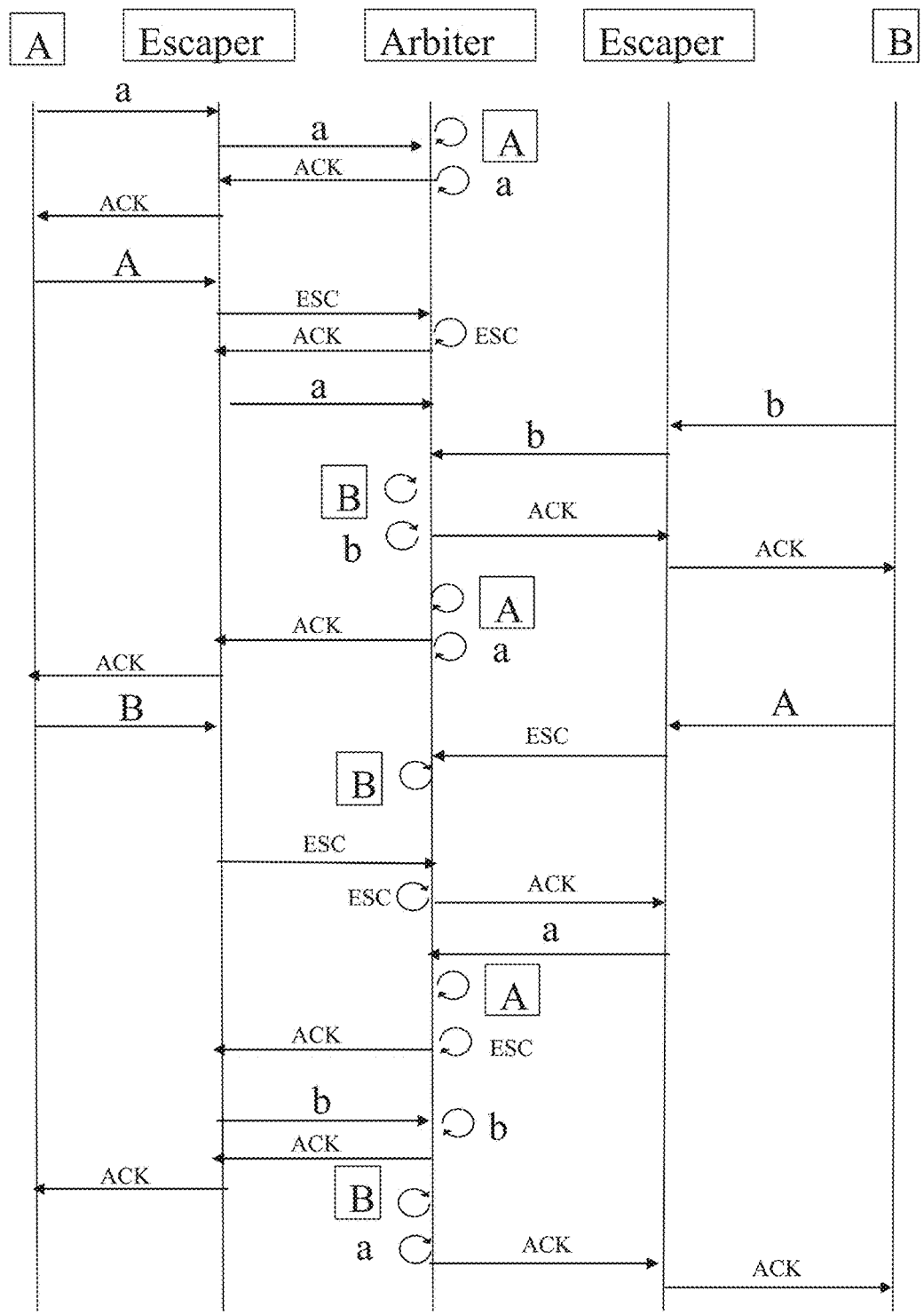
FIG. 8 is a communications diagram showing the interactions between channels, their escapers, and an arbiter.

In FIG. 8 is shown a communications flow between logical data producers A and B, their dedicated escapers 120, 120' and the arbiter. In FIG. 8, each byte has been acknowledged with ACK, as required before another input byte can be processed.

As can be readily appreciated, the protocol overhead and the control componentry required for this implementation are still sufficiently lightweight and flexible for use across a wide range of devices, even when resources are highly constrained. The present technique is suitable for use, for example, in constrained Internet of Things (IoT) devices, mobile devices and the like, where power, available pinouts or ports of devices and bandwidth constraints are important considerations.

The present technology further provides a mechanism by which the basic four logical channels may be expanded by the use of a refinement of the escaper-arbiter and router-unescaper mechanism previously described. Thus, when four end-points are not sufficient for some cases, it is possible to implement embedding of logical channels within logical channels using the same technique.

Through this nesting technique, one channel can be sacrificed to change it into four "sub-channels" creating a hierarchy of four child channels within a single parent channel. In practice this is achieved by running the same protocol as above inside another level of the protocol, by using multiple levels of escaping, arbitration, routing and unescaping.

Because a logical channel according to the present technology satisfies the same requirements as a physical channel, it can be treated in the same manner as a physical channel, to allow nesting of sub-channels in the same manner as channels are handled over the physical channel. The same four channel switch markers are reused at the sub-channel level, by means of a double-escape technique. For example, if there are four sub-channels within channel 0, channel switch marker STP0 can be reused at the sub-channel level to represent selection of sub-channel 4 (the zero-th sub-channel of channel 0), after channel 0 has been selected using a first STP0.

An incidental occurrence in the input data to Channel0 of a byte that matches STP0 will thus need to be double-escaped using the parent channel escaper and an additional sub-channel escaper in order to be transmitted verbatim over the physical serial channel.

This requires some additional infrastructure in the provision of additional instances of escapers and unescapers for the sub-channels. The routing technique to assign data to consumers also requires additional function to recognise the additional channels. Each sub-channel level in the hierarchy also requires an additional arbiter to select the sub-channel to be used at any time. In the present implementation, a logical channel used to provide sub-channels cannot itself be used as a transfer path, but can only be used as a parent logical channel by its sub-channels. Each sub-channel in its level of the hierarchy thus requires its own escaper which performs the necessary further escaping and transposing before a byte can be transmitted over the sub-channel when the sub-channel is selected by the sub-channel level arbiter for transmission over the physical serial channel 104.

Each sub-channel also requires its own unescaper, which receives an unescaped and reverse transposed data flow from the parent router and unescaper. The sub-channel levels of router and unescaper then perform the further unescaping and routing process on the data flows they have received from their parents in the hierarchy.

Figure 9:
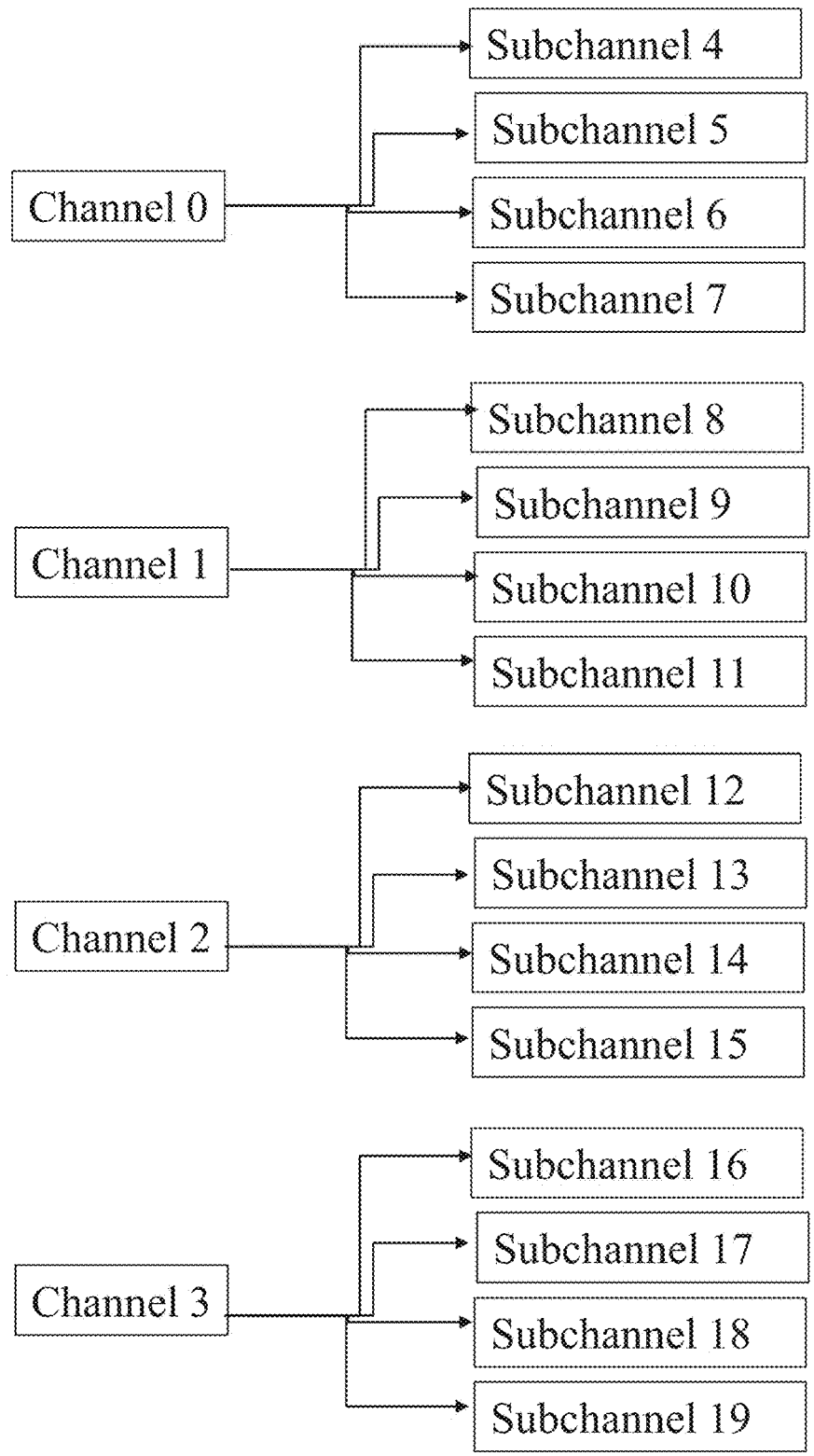
FIG. 9 shows an implementation of the technique for encapsulating sub-channels within parent channels.

In a basic four-logical-channel construct as described above, the maximum number of sub-channels thus becomes 4×4=16, as shown in FIG. 9. In FIG. 9, a parent channel, logical channel 0 for example, can accept data from Producer4 and, by means of the refined escape mechanism, pass it correctly to Consumer4. This will become clearer in the light of the following example. Producer4, Producer5, Producer6 and Producer7 are sub-channels of Channel0. Producer0 is, as stated above, not available for any other functions. It should be noted that that expansion of a parent channel into sub-channels creates a closed namespace. It is thus impossible to have Producer6 communicate to Consumer1. The set of available channel indexes remains the same within each sub-channel 0, 1, 2, 3. Thus, for example, within channel 0, the STP0 marker refers to channel 4, the STP1 marker refers to channel 5, and so forth.

The following worked example illustrates the principles of the encapsulation:

Producer4 has data for Consumer4

Sub-arbiter at a sub-channel level starts a frame from Producer4 to Consumer4 by writing STP0

Arbiter at the parent level intercepts the STP0 byte and begins writing a frame to Consumer0 with STP0

Escaper0 writes ESC, because the following payload is STP0

Escaper0 transposes received STP0 to TSTP0 and provides it to physical serial channel 104

Producer4 follows with ordinary data byte XX

Ordinary data byte XX is written to physical serial channel 104

Sub-arbiter at a sub-channel level starts a frame from Producer5 to Consumer5 by writing STP1

Escaper0 escapes it and writes ESC TSTP1

Producer5 data contains a byte incidentally containing the same bits as an ESC byte Escaper5 escapes and transposes ESC to produce ESC TESC Escaper0 escapes and transposes the ESC to produce ESC TESC TESC and sends ESC TESC TESC over physical serial channel 104.

Overall, the communication on the serial physical channel is as follows:

STP0 ESC TSTP0 XX ESC TSTP1 ESC TESC TESC

Figure 10:
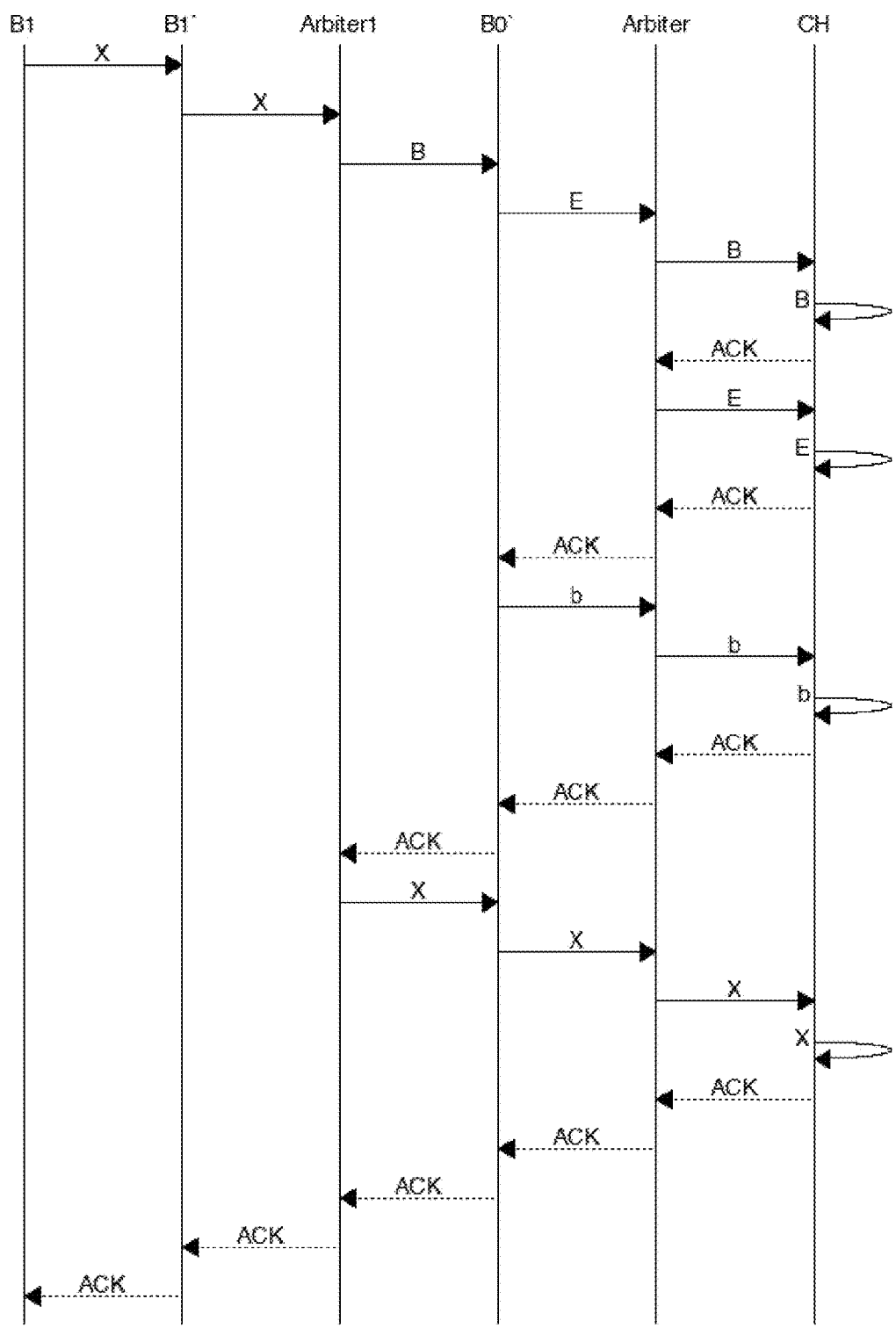
FIGS. 10, 11 and 12 show representations of communications among components (in a similar arrangement to FIG. 8) in a channel-in-channel implementation of the present technology.
Figure 11:
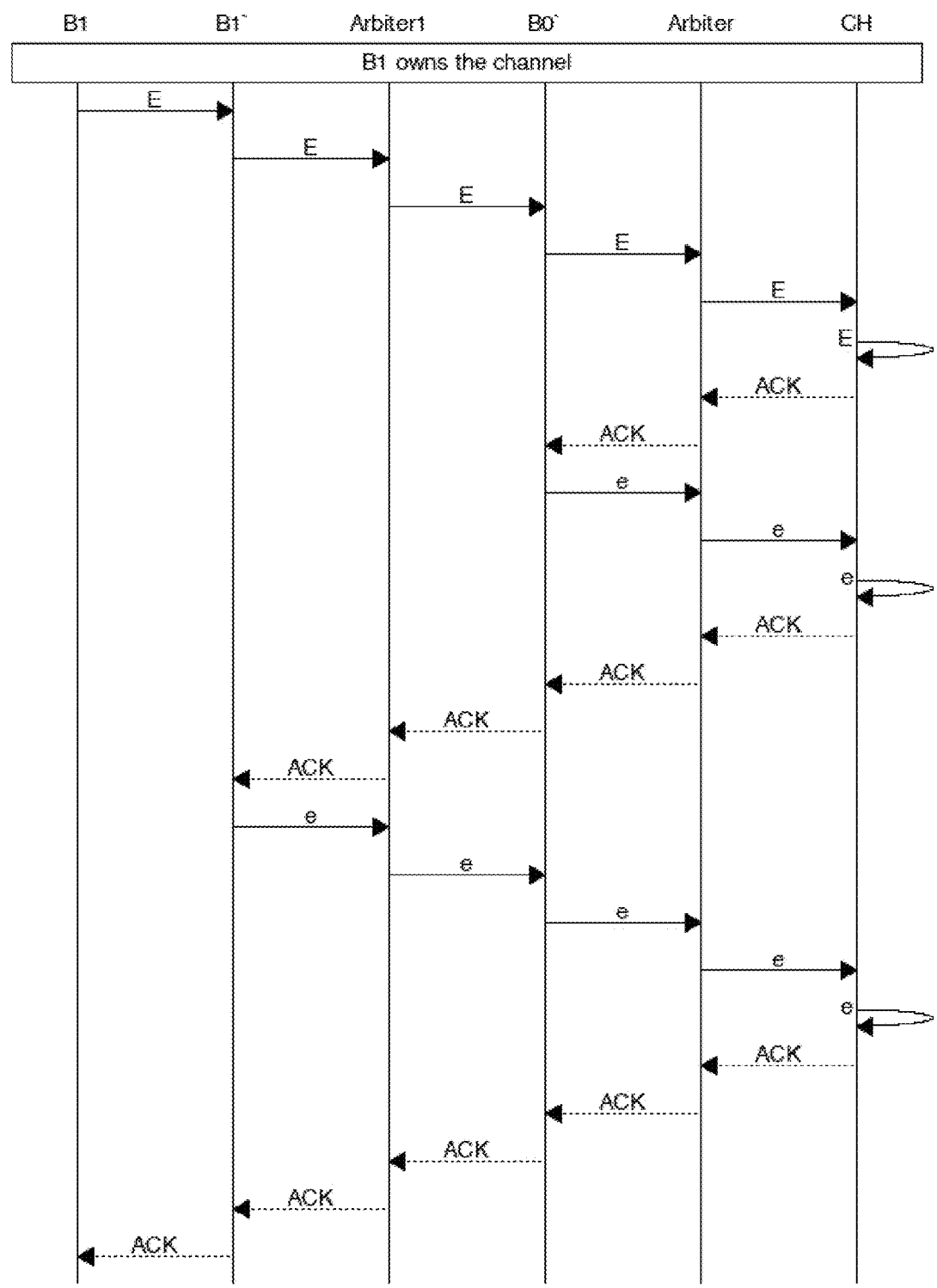
Figure 12:
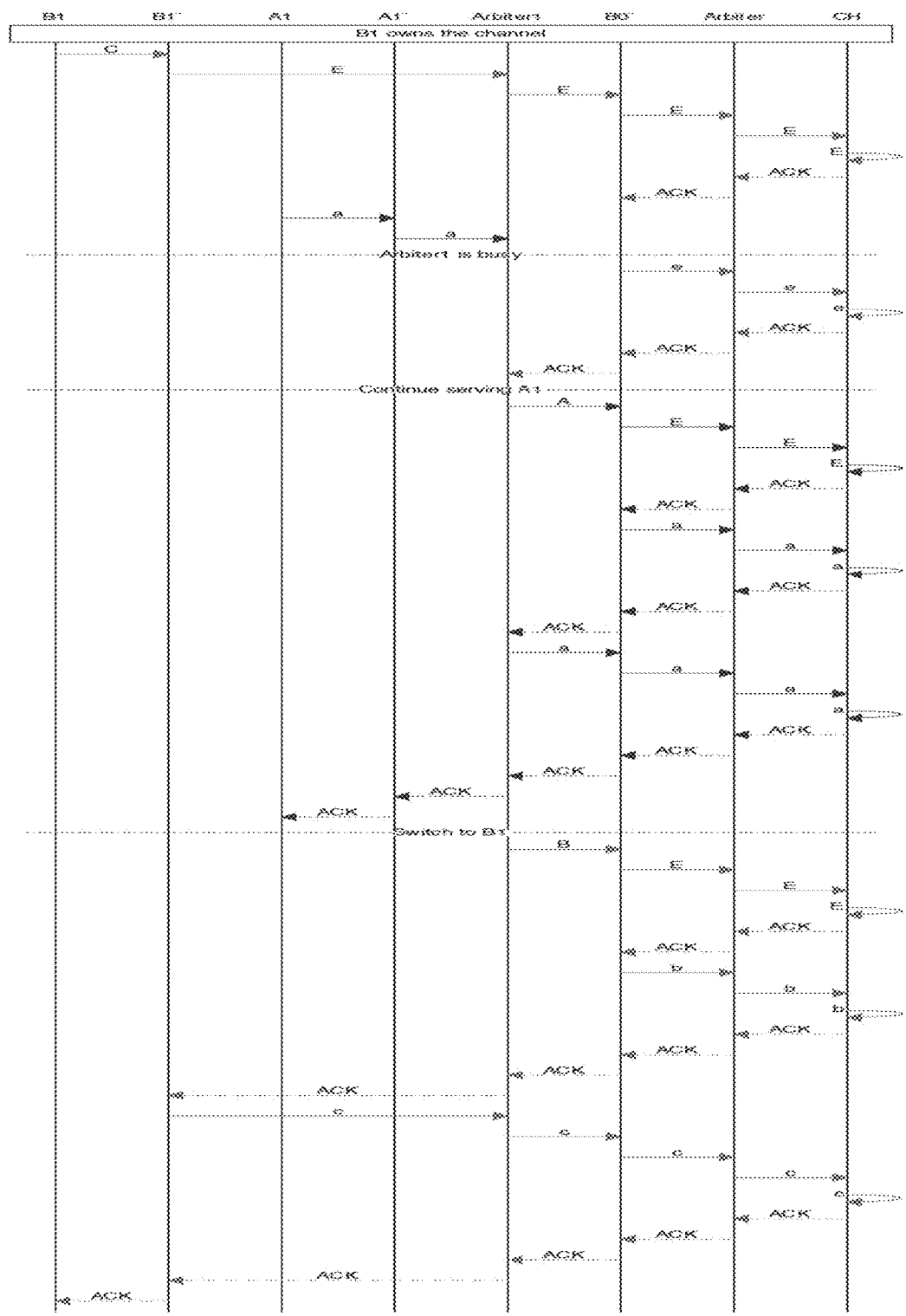

In FIGS. 10, 11 and 12, there are shown the communications among components of a simple channel and sub-channel arrangement in which data producers B1 and A1 are sub-channels of parent channel B. The contention between data producers B1 and A1 is mediated by Arbiter1, the sub-channel level arbiter. The parent channel B contention with its peers for access to CH (the physical serial channel) is mediated by Arbiter, the parent channel level arbiter. B1' and A1' represent the escape-and-transpose function at the sub-channel level. B0' represents the escape and transpose function at the parent level. In each of these FIGS., it can be seen how the hierarchy of channels and sub-channels can be implemented by reusing the principles of the basic channel arrangement, for which a similar representation has been shown in FIG. 8.

Thus, to take FIG. 10 as an example, B0 has been sacrificed to become a parent channel to provide sub-channels. A sub-channel initiates a communication. The sub-channel's own stop marker is, in this case, the same as the parent channel stop marker. The B-E-b sequence is delivered over the physical channel because:

"B" is issued, as the parent level arbiter has given control of the physical serial channel to B0—in this case, "B" is B0's stop marker.

In this example, "E" is the escape marker, and so E-b occurs because the sub-channel level arbiter gives control of the sub-channel to B.

The present technology can also, with little additional overhead, produce further levels of sub-channels using the same technique and components to sacrifice one or more sub-channels to provide sub-sub-channels and so on. In all implementations of the present technology, the channel-in-channel encapsulation will only cause additional overhead when escaping. Normal data bytes are no more resource-consuming regardless of the number of levels in the encapsulation hierarchy. The ESC encoding overhead merely grows linearly with the number of levels in the hierarchy, thus continuing to higher functionality with relatively a light protocol overhead. The number of bytes used to transfer the deep-most ESC equals the number of levels plus one.

There follow some non-exhaustive implementation descriptions relating to various operating systems. In operating systems supporting pipes, for example, a pipe may be created for every producer-consumer pair to provide input to the relevant channel. Pipes provide some buffering as well as file descriptors. A child process can inherit parent's file descriptors, if it is not desirable to make any changes at the application level. Existing applications may then communicate over the multiplexed channel through pipe redirection.

In other implementations, the applications may be supported by creating virtual serial port pairs and binding them with a virtual null-modem cable. In this way, applications expecting to operate with real serial data will accept the data as if was passing through a real serial port. The consumer end may be implemented as a driver on the serial port and provide some file-like objects that can be read and be written-to by an application. For an existing application that writes its output on STDOUT, operation proceeds unchanged.

The disclosed technology offers excellent opportunities for implementing advanced quality-of-service (QoS) policies (such as prioritization of the outputs of certain data producers, the amount of accumulated data in a buffer, or a time slicing algorithm, to give a few examples) in the transmitting end. The receiving end is not affected by the QoS policies of the transmitting end and can re-assemble and re-route incoming data to the correct data consumers independently of the transmission QoS policies.

As will be appreciated by one skilled in the art, the present technique may be embodied as a system, method or computer program product. Accordingly, the present technique may take the form of an entirely hardware embodiment, an entirely software embodiment, or an embodiment combining software and hardware. The components described may thus comprise discrete hardware devices, core elements of devices, software or firmware entities, or hybrid hardware/software/firmware entities.

Furthermore, the present technique may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method of multiplex operation of an electronic transmitting apparatus, comprising:
   establishing at least two logical channels between channel-specific logical data producers associated with said electronic transmitting apparatus and respective channel-specific logical data consumers dissociated from said electronic transmitting apparatus, said at least two logical channels operable to pass data over a serial physical channel;
   constructing by a first of at least two said channel-specific logical data producers a first variable-length data frame payload;
   identifying a respective channel-specific logical data consumer for said first variable-length data frame payload;
   arbitrating use of said serial physical channel between said at least two logical channels to control sending of said first variable-length data frame payload;
   injecting a channel-specific logical protocol stop indicator into a data flow over said serial physical channel to instruct a receiving router to stop receipt of a previously started data flow and route said first variable-length data frame payload to a channel-specific consumer; and
   sending at least a first uninterruptible data unit of said first variable-length data frame payload over said serial physical channel.

2. The machine-implemented method as claimed in claim 1, any uninterruptible data unit in said first variable-length data frame payload coincidentally corresponding to said channel-specific logical protocol stop indicator being escaped and transformed to be transmitted verbatim.

3. The machine-implemented method as claimed in claim 1, any uninterruptible data unit in said first variable-length data frame payload coincidentally corresponding to an escape indicator being itself escaped and transformed to be transmitted verbatim.

4. The machine-implemented method as claimed in claim 1, said establishing at least two logical channels comprising establishing a set of logical channels at a first level in a hierarchy and subdividing at least one of said set of logical channels into a subset of logical channels at a second level of said hierarchy to accommodate additional instances of said channel-specific logical data producers and additional instances of said channel-specific logical data consumers.

5. The machine-implemented method as claimed in claim 4, wherein a logical channel of said set of logical channels at a first level of said hierarchy and at least one logical channel of said set of logical channels at a second level of said hierarchy are co-operable using at least one said escape indicator and at least one said channel-specific logical protocol stop indicator to imbed said first variable-length data frame payload at said second level of said hierarchy within said first level of said hierarchy.

6. The machine-implemented method as claimed in claim 1, wherein said sending at least a first uninterruptible data unit over said serial physical channel further comprises buffering said first variable-length data frame payload for subsequent transmission over said serial physical channel.

7. The machine-implemented method as claimed in claim 1, wherein sending at least a first uninterruptible data unit over said serial physical channel and thereby stopping said receipt of said previously started data flow occurs when said first variable-length data frame payload has at least one of the following characteristics:
   being data of a higher priority than a payload of said previously started data flow;
   being data contained in a buffer that has passed threshold measure;
   being data from a preference-weighted source;
   being data for a preference-weighted consumer;
   being data at a logical data producer selected by a time-slicing technique.

8. The machine-implemented method as claimed in claim 1, wherein said channel-specific logical protocol stop indicator is selected from a set of least-used codes of a code page for a type of data in said first variable-length data frame payload.

9. A machine-implemented method of multiplex operation of an electronic receiving apparatus, comprising:

receiving from a transmitting apparatus over a serial physical channel a data transmission comprising a channel-specific logical protocol stop indicator and a variable-length data frame payload;

identifying an intended consumer according to said channel-specific logical protocol stop indicator; and passing said variable-length data frame payload to said intended consumer identified by said channel-specific logical protocol stop indicator.

10. The machine-implemented method as claimed in claim 9, further comprising identifying any pair of uninterruptible data units in said data transmission comprising an escape indicator followed by at least one of a transformed channel-specific logical protocol stop indicator and a transformed escape indicator as an indicator of a coincidental correspondence in data and being unescaped and reverse transformed to be passed verbatim to said intended consumer.

11. A non-transitory, computer-readable medium comprising computer program code to, when loaded into a computer system and executed thereon, cause said computer system to perform all the steps of the method of claim 1.

* * * * *